May 5, 1959 B. D. LOUGHLIN 2,885,464

COLOR OR MONOCHROME, IMAGE-REPRODUCING APPARATUS

Filed Oct. 7, 1953 2 Sheets-Sheet 1

May 5, 1959 B. D. LOUGHLIN 2,885,464

COLOR OR MONOCHROME, IMAGE-REPRODUCING APPARATUS

Filed Oct. 7, 1953 2 Sheets-Sheet 2

2,885,464

COLOR OR MONOCHROME IMAGE-REPRODUCING APPARATUS

Bernard D. Loughlin, Lynbrook, N.Y., assignor to Hazeltine Research, Inc., Chicago, Ill., a corporation of Illinois Application October 7, 1953, Serial No. 384,560

20 Claims. (Cl. 178—5.4)

*General*

Figure 1:
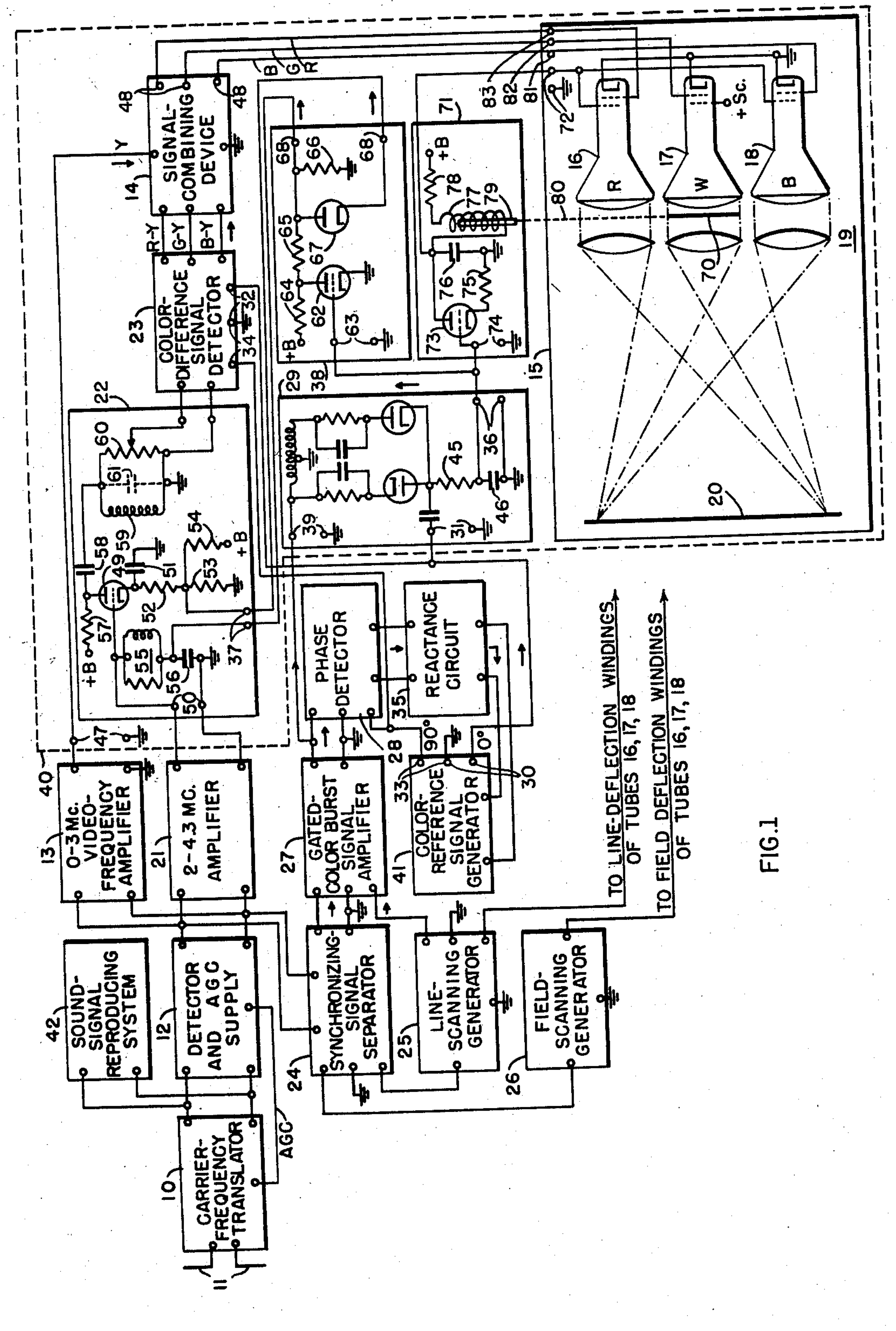

The present invention relates generally to image-reproducing apparatus for use in compatible television receivers and, more particularly, to image-projection apparatus having utility in such receivers.

The maintenance of adequate optical registration of the tricolor images developed by the display system of a color-television receiver is a common problem encountered in the design of such a receiver. The lack of perfect registration in the display of color-television receivers produces spurious colors at the boundaries between areas of different colors, which boundaries are usually referred to in the art as edges. When such receivers are reproducing images in color, these spurious colors tend to be masked by the presence of the desired colors in the images so that impairment of the quality of the reproduced image by the influence of the spurious colors is less noticeable. However, when compatible color-television receivers are employed to receive monochrome television information, experience has indicated, with reference to viewer acceptability of reproduced images in monochrome, that the registration requirements for the usual three color components which are employed to reproduce the image in black is much more stringent. The registration requirements in a compatible color-television receiver for black and white reproduction as contrasted with the requirement for color reproduction may be as much as several times as severe since the acuity of the eye to details represented in black and white is much greater than for details in color.

It is an object of the present invention, therefore, to provide a new and improved image-reproducing apparatus for a compatible color-television receiver which is effective to produce colored pictures of acceptable quality and monochrome pictures of a quality superior to that afforded by prior such receivers.

It is another object of the invention to provide a new and improved image-reproducing apparatus for a compatible color-television receiver wherein the registration problems in connection with the reproduction of monochrome images are materially simplified.

It is a further object of the invention to provide a new and improved image-reproducing apparatus for a compatible color-television receiver which is effective to produce a more acceptable image in monochrome, particularly in the detail portions of the reproduced image.

It is yet another object of the invention to provide a new and improved image-projection apparatus for a compatible color-television receiver which is relatively simple in construction and inexpensive to manufacture.

In accordance with the present invention, an image-reproducing apparatus for use in a compatible color-television receiver for receiving either a color-television signal including chromaticity-representative components or a monochrome television signal comprises circuit means responsive to the received color-television signal for developing from the aforesaid chromaticity-representative components a control effect having a first value in the presence of those components and a second value in the absence thereof. The image-reproducing apparatus further includes an image-reproducing system responsive to the received signals and comprising a plurality of cathode-ray image-reproducing devices including at least one responsive to the color-television signal for individually producing images in an individual color and a second responsive to the aforesaid signals for producing monochrome images and comprising an optical filter for the aforesaid second device selectively adjustable to permit the second device to produce images in monochrome or in a second color. The image-reproducing apparatus additionally includes control means coupled to the aforesaid developing circuit means and the filter and responsive to the first value of the control effect for adjusting the filter to permit the system to produce images in color and responsive to the second value of the control effect for effectively removing the filter so that images only in monochrome are produced.

For a better understanding of the present invention, together with other and further objects thereof, reference is had to the following description taken in connection with the accompanying drawings, and its scope will be pointed out in the appended claims.

Figures 2A, 2B:
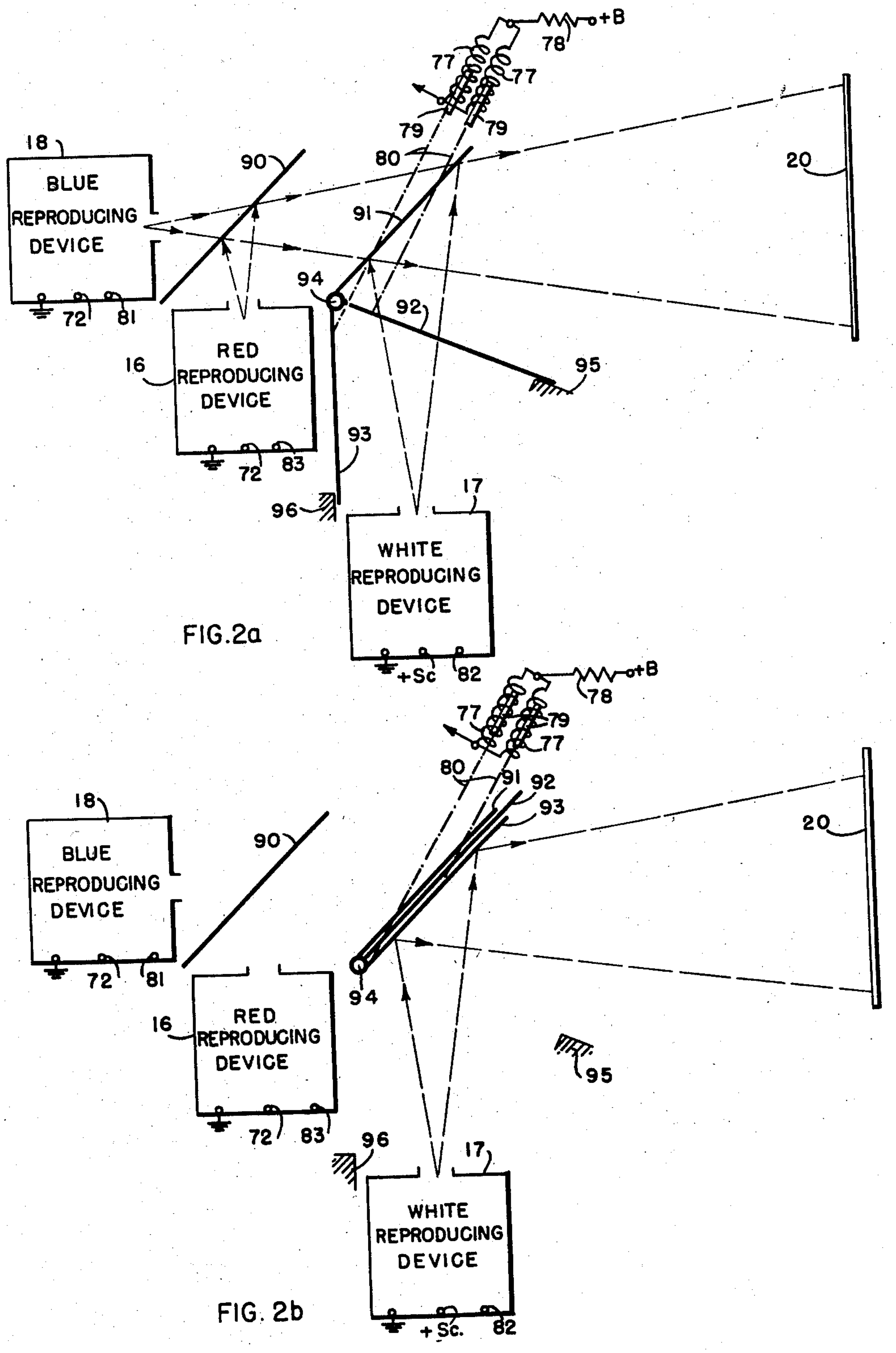

Referring to the drawings:

Fig. 1 is a schematic circuit diagram of a compatible color-television receiver including an image-reproducing apparatus in accordance with the invention, and Figs. 2*a* and 2*b* are diagrammatic representations of portions of a modification of the image-reproducing apparatus of Fig. 1 in two different operating conditions.

*General description of receiver of Fig. 1*

Referring now to Fig. 1 of the drawings, there is represented a color-television receiver of the superheterodyne type such as may be used in a color-television system of the type described in an article by C. J. Hirsch, W. F. Bailey, and B. D. Loughlin entitled "Principles of NTSC Compatible Color Television" in the February 1952 issue of the magazine "Electronics" at pages 88–95, inclusive. Such a receiver may utilize a conventional monochrome signal to reproduce an image in black and white or may employ a composite color-television signal including luminance components and modulated subcarrier components such as the chromaticity components and a periodic pulse-modulated color synchronizing-signal component to reproduce an image in color. The chromaticity components mentioned above and/or the pulse-modulated color-synchronizing signal components may be referred to generically as chromaticity-representative components. The receiver includes a carrier-frequency translator 10 having an input circuit coupled to an antenna system 11, 11. The unit 10 is of a conventional construction and may include one or more stages of radio-frequency amplification, an oscillator-modulator, and one or more stages of intermediate-frequency amplification. Coupled in cascade with the output circuit of the translator 10, in the order named, are a detector and automatic-gain-control supply 12, a video-frequency amplifier 13 having a pass band preferably of 0–3 megacycles, a signal-combining device 14 of conventional construction, and an image-reproducing system 15 of the projection type including three image-reproducing devices or cathode-ray tubes 16, 17, and 18, a refractive-type optical-projection unit 19, and a display screen 20. The unit 15, which will be described in greater detail subsequently, is a portion of an image-reproducing apparatus 40 in accordance with the present invention. The amplifier 13 is an amplifier for the brightness or luminance component of the composite color-television signal and has a pass band with an upper frequency limit which may be effective to prevent the translation there-through of the color subcarrier frequency of about 3.58 megacycles.

An output circuit of the detector 12 is also coupled to the signal-combining device 14 through an amplifier 21, preferably having a pass band of from 2 to 4.3 megacycles and which may be a conventional band-pass filter, a controllable amplifier 22, and a color-difference signal detector 23 having three output circuits individually coupled to individual ones of three input circuits of the signal-combining device. Units 21 and 22 are amplifiers for the chrominance or color portion of the composite television signal. The color portion comprises a subcarrier wave signal having a frequency of about 3.58 megacycles modulated at different phase points by signals individually representative of different primary colors. The controllable amplifier 22, which will be described more fully hereinafter, may be of the type described in detail in connection with Fig. 1*a* of the copending application of Donald Richman, Serial No. 368,067, filed July 15, 1953, and entitled "Control Apparatus for Color-Television Receiver." The color-difference signal detector 23 may be of a conventional type such as that more fully described in the above-mentioned article in the publication "Electronics." To that end, the color-difference signal detector 23 comprises a plurality of synchronous detectors or modulators for heterodyning the modulated subcarrier wave signal appearing at the output terminals of the controllable amplifier 22 with locally generated signals having the same frequency but quadrature-phase relations to derive the color-difference signals which are the modulation components at the different phase points of the modulated subcarrier wave signal. The unit for developing the locally generated heterodyne wave signals will be described subsequently. The color-difference signal detector 23 may include a simple matrixing system for combining predetermined relative proportions of the derived components to develop the desired color-difference signals R—Y, G—Y, and B—Y representing, respectively, the red, green, and blue values of a televised image. However, for the purpose of the present invention, the apparatus 23 need not be limited to the type of apparatus just mentioned but may, for example, be a simple system of networks for deriving the three signals representative of the three primary colors of the image, the nature of the deriving apparatus being determined by the manner in which such signals are encoded and any number of conventional coding systems and decoders may be employed.

The signal-combining circuit 14 may comprise three individual adder circuits of conventional construction for adding individual ones of the three different output signals of unit 23 with the luminance signal from the video-frequency amplifier 13 to develop in the output circuits of unit 14 individual ones of the red, green, and blue color signals for application to the cathode-ray tubes 18, 17, and 16, respectively, of the image-projection system 15.

An output circuit of the detector 12 is also coupled through a synchronizing-signal separator 24 to the line-scanning generator 25 and a field-scanning generator 26, output circuits of the latter units being coupled to individual ones of the line-deflection and field-deflection windings (not shown) of the cathode-ray tubes 16, 17, and 18. Output circuits of the separator 24 and the line-scanning generator 25 are coupled to the input circuits of a conventional gated color burst signal amplifier 27, the output circuit of which is coupled to an input circuit of a phase detector 28 and to an input circuit of a similar detector 29 constituting a synchronous detector through a pair of input terminals 39, 39 for the latter. A color-reference signal generator 41 of conventional construction, which is capable of generating a pair of sine-wave signals in phase quadrature wherein each has a suitable frequency such as 3.58 megacycles, has its output terminals 30, 30 for the in-phase voltage coupled to a pair of input terminals 31, 31 of the detector 29 and to a pair of input terminals 32, 32 of the color-difference signal detector 23. Output terminals 33, 33 of the generator 41 supplying the quadrature voltage are coupled to another input circuit of the phase detector 28 and to the input terminals 34, 34 of the color-difference signal detector 23. To maintain the signals developed by the generator 41 in proper phase relation with reference to the phase of the pulse-modulated color-synchronizing signal components or color burst signal derived by the amplifier 27, the output circuit of the phase detector 28 is coupled in a conventional manner to the generator 41 through a reactance circuit 35.

Output terminals 36, 36 of the detector 29 are coupled to a pair of input terminals 37, 37 of the controllable amplifier 22 through a control unit 38 to be described subsequently. The automatic-gain-control supply of the unit 12 is connected through a conductor identified as AGC to the input terminals of one or more of the stages of the translator 10 for controlling the gains of those stages to maintain the signal input to the detector of unit 12 within a relatively narrow range for a wide range of received signal intensities. A conventional sound-signal reproducing system 42 is also connected to an output circuit of the unit 10 and may include the usual stages of intermediate-frequency amplification, a sound-signal detector, stages of audio-frequency amplification, and a sound-reproducing device.

*General operation of receiver of Fig. 1*

Considering now briefly the operation of the receiver of Fig. 1 as a whole with reference to a received color-television signal, and assuming that the image-reproducing system 15 is of conventional construction wherein the cathode-ray tubes 16, 17, and 18 are effective to produce images in red, green, and blue light, a modulated color-television wave signal is intercepted by the antenna system 11, 11, is selected, amplified, and converted to an intermediate frequency and further amplified in the unit 10, and the video-frequency modulation components thereof are then derived in the detector 12 to develop a composite video-frequency signal. The latter signal comprises the usual line-frequency, field-frequency, and color burst synchronizing components, the modulated subcarrier components or chromaticity signal, and a luminance or brightness signal. The luminance signal is further amplified in the video-frequency amplifier 13 and applied to an input circuit of the signal-combining device 14 for utilization in a manner to be described hereinafter. For convenience this signal has been designated as the Y signal.

The line-frequency and field-frequency synchronizing signals together with the color burst signal for synchronizing the operation of the color-reference signal generator 41 are separated from the other video-frequency components, and at least some of these synchronizing signals are separated from each other in the synchronizing-signal separator 24. The line-frequency and the field-frequency synchronizing signals are applied to the units 25 and 26, respectively, to synchronize the operation thereof with corresponding units at the transmitter. The generators 25 and 26 supply signals of saw-tooth wave form which are properly synchronized with reference to the transmitted signal and are applied to individual ones of the line-deflection and field-deflection windings (not shown) of the cathode-ray tubes 16, 17, and 18 to cause the cathode-ray beams thereof to effect a rectilinear scanning of the fluorescent screens of those tubes. The color burst signal from unit 24, which is but a few cycles of a 3.58 megacycle pulse-modulated subcarrier wave signal and has a desired reference phase with respect to the modulated subcarrier wave signal, is applied to the amplifier 27 along with a periodic gating signal from the line-scanning generator 25 developed during the retrace intervals thereof. The gating signal periodically renders the amplifier 27 conductive to translate the color burst signal to the phase detector 28. When the reference wave signal generated at the terminals 33, 33 of the unit 41 and applied to the phase detector 28 varies from its desired quadrature relation with reference to the color burst wave signal from unit 27, the phase detector 28 derives an error signal that is applied to the reactance circuit 35 which, in turn, develops in the well-known manner a reactive current for correcting the frequency and phases of the output signals of the color-reference signal generator 41.

The modulated subcarrier components or chromaticity signal are amplified in the amplifier 21 and are applied through the controllable amplifier 22 (which for the purposes of the present explanation will be assumed to be in a signal-translating condition) to the color-difference signal detector 23. As more fully explained in the above-identified article in the magazine "Electronics," the signal developed by the generator 41 and the modulated subcarrier wave signal are heterodyned in the detector 23 to derive the modulation components at predetermined phase points of the subcarrier wave signal. In the manner described in the aforementioned article, these derived modulation components are then combined in proper proportions and senses in the matrixing circuit in the unit 23 to develop the color-difference signals $R-Y$, $G-Y$, and $B-Y$ representative, respectively, of the red, green, and blue of a televised color image. In the unit 14, the brightness signal applied thereto from the amplifier 13 and the color-difference signals $R-Y$, $G-Y$, and $B-Y$ from unit 23 are combined to develop the proper red, green, and blue signals identified as R, G, and B to control the intensities of the cathode-ray beams in the individual cathode-ray tubes of the image-reproducing system 15. This intensity modulation of the cathode-ray beams results in the excitation of screens of different color phosphors and the light emitted by the fluorescent screens of the cathode-ray tubes is optically combined by the action of the optical projection unit 19 on the display screen 20 to reproduce an image in color.

The automatic gain control or AGC developed in the unit 12 is effective to control the amplification of one or more of the stages of unit 10 thereby to maintain the signal input to the detector 12 and to the sound-signal reproducing system 42 within a relatively narrow range for a wide range of received signal intensities. The sound-signal modulated wave signal having been selected and amplified in the unit 10 is applied to the system 42 wherein it is amplified and detected to derive the sound-signal modulation components which may be further amplified and then reproduced by the image-reproducing device therein.

The above explanation has been presented on the assumption that a wave signal intercepted by the antenna system 11, 11 is a color-television signal. If, however, the intercepted signal is a conventional monochrome television signal, then a video-frequency signal of the monochrome type is derived by the detector 12 and translated through the amplifier 13 and applied through the signal-combining device 14 to individual brilliancy-control electrodes of the cathode-ray tubes 16, 17, and 18. At such time, modulated subcarrier components representative of color are absent and chromaticity components are not translated by units 21 and 22 to the unit 23 so that the latter cannot then derive color-difference signals. The monochrome signal applied to the signal-combining device 14 causes the different electron beams of the cathode-ray tubes 16, 17, and 18 to excite the fluorescent screens thereof which fluoresce in different color lights in such a manner that these lights emitted therefrom are in proper relative proportions to be combined on the screen 20 by the optical system 19 to reproduce a monochrome image having a full range of brightnesses.

*Description of image-reproducing apparatus 40 of Fig. 1*

Referring now more particularly to the image-reproducing apparatus 40 of Fig. 1, that apparatus comprises circuit means including the detector 29 which is responsive conjointly to the chromaticity-representative components of the received color-television signal, in particular, to the pulse-modulated subcarrier component or color burst signal derived by the gated amplifier 27, and to the in-phase component of the color-reference signal developed at the output terminals 30, 30 of the generator 41 for developing a control effect having a first value in the presence of the chromaticity-representative components and a second value in the absence thereof. As previously mentioned, the detector 29 is of conventional construction and includes in its output circuit an integrating network comprising a series-connected resistor 45 and a condenser 46 for developing across the latter and between a pair of output terminals 36, 36 connected thereto a unidirectional control effect having a maximum negative value when the color burst synchronizing signal applied to the input terminals 39, 39 is in-phase with the signal applied to the other input terminals 31, 31 from the color-reference signal generator 41, the control effect also having a minimum of zero value in the absence of the color burst signal.

The image-reproducing apparatus 40 may also include a signal-translating channel responsive generally to the received monochrome signal and to the luminance components of the color-television signal applied to the antenna system 11, 11. More particularly, this channel, which comprises the circuit connected between a pair of input terminals 47, 47 of unit 40 and output terminals 48, 48, 48 of the signal-combining device 14, as responsive to the monochrome signal and to the luminance components derived by the detector 12 and amplified by the video-frequency amplifier 13. The apparatus 40 further includes a detector system, responsive to the modulated subcarrier components from the detector 12 and the video-frequency amplifier 21 this system including, in cascade, the controlled amplifier 22, responsive to the first value of the control effect derived by the detector 29 during the duration of that value, and a detector comprising the units 23 and 14 having output circuits, namely, the three output circuits of the unit 14, for deriving therein during the duration of the first value of the control effect developed across the condenser 46 the chromaticity components of the modulated subcarrier components. As will be explained subsequently, the controlled amplifier 22 is responsive to the second value of the control effect derived across the condenser 46 of unit 29 during the duration of that second value for interrupting the chromaticity deriving circuits. The amplifier 22 comprises an electron-discharge device such as a triode 49 having a pair of control electrode-cathode input terminals 50, 50 coupled to the output circuit of the video-frequency amplifier 21, and having a cathode network comprising a condenser 51 connected in parallel with the series combination of resistors 52 and 53. A source of potential +B, which is coupled through a resistor 54 to the junction of the resistors 52 and 53 and is also coupled to one of the input terminals 37, 37, develops across the resistor 53 a potential normally effective to maintain the tube 49 in a nonconductive condition. Coupled across the input circuit of the tube 49 is the series combination of a tuned filter circuit 55, preferably having the pass band of amplifier 21, and a condenser 56. The junction of the condenser 56 and the tuned circuit 55 is connected to the other of the input terminals 37, 37. The anode of the tube 49 is connected to a source of potential +B through a resistor 57 and is also coupled to ground through a condenser 58 and a load circuit comprising an inductor 59 connected in parallel with a resistor 60 and a condenser 61 represented in broken-line construction since it may comprise, in whole or in part, the inherent capacitance of the output circuit of the tube. A tapped portion of the resistor 60 is coupled through a pair of output terminals to an input circuit of the color-difference signal detector 23.

As previously mentioned, the output terminals 36, 36 of the phase detector 29 are coupled to the input terminals 37, 37 of the controllable amplifier 22 through the control unit 38 which controls the signal-transmitting condition of the amplifier 22. Unit 38 includes a triode 62 having its control electrode-cathode circuit connected to a pair of input terminals 63, 63, and its anode connected to an intermediate point on a voltage divider comprising the series combination of resistors 64, 65, and 66 coupled across a source of potential +B. A diode 67 has its anode and cathode connected to a pair of output terminals 68, 68 which, in turn, are connected to the terminals 37, 37 of amplifier 22. The anode of the diode 67 is connected to the junction of the resistors 65 and 66.

The image-reproducing apparatus 40 further includes the image-reproducing system 15 comprising the three cathode-ray tubes 16, 17, and 18, the refractive-type optical projection unit 19 therefor, and the image screen 20. Two of the tubes 16 and 18 are designed individually to produce images in individual ones of two primary colors while the third tube 17 is designed to produce monochrome images. The tubes 16 and 18 are of conventional construction, the former including a fluorescent screen which emits red light when excited by a cathode-ray beam and the latter includes a fluorescent screen which emits blue light under a similar condition. The image-projection system 15 includes an optical filter 70 of suitable material such as green-colored film for positioning in front of the fluorescent screen of the tube 17, and the filter is selectively adjustable to permit that tube to produce images in monochrome or in a third primary color, that is, in green. To that end, the filter 70 is movably adjustable, in a manner to be explained subsequently, from a first position wherein it is external to the optical path between the fluorescent screen of tube 17 and the optical projection unit 19 to a second position wherein the filter is in that path.

The image-reproducing apparatus of the present invention also includes a control means or circuit 71 coupled to the output terminals 36, 36 of the detector 29 and to the image-projection system 15, namely, to a pair of input terminals 72, 72 thereof, and is responsive to the first value of the control effect developed across the condenser 46 of detector 29 for adjusting the filter 70 and the system 15 to permit the latter to produce images in color. In a manner presently to be described, this control circuit is also responsive to the second value of that control effect for adjusting the filter 70 and the system 15 so that only images in monochrome are developed. The control circuit 71 includes an electron-discharge device such as a triode 73 having its input circuit connected through a pair of terminals 74, 74 to the output terminals 36, 36 of the detector 29. The tube 73 includes a cathode resistor 75, and the anode of the former is connected to ground through a by-pass condenser 76 and to a source of potential +B through a series circuit including a winding 77 and a resistor 78. The anode-cathode output circuit of the tube 73 is also connected through the pair of terminals 72, 72 to beam-control electrodes comprising the screen electrodes of the tubes 16 and 18. The screen electrode of tube 17 is connected to a source of potential indicated as +*Sc*. The winding 77 comprises a portion of an electrical motor including a ferromagnetic core 79 which is mechanically connected by an arm 80, represented in broken-line construction, to the filter 70 for displacing the latter with reference to the screen of the cathode-ray tube 17. The control electrodes of tubes 16, 17, and 18 are coupled through terminals 83, 82, and 81 and suitable circuit connections to the output terminals 48, 48, 48 of the signal-combining device 14.

*Operation of image-reproducing apparatus 40 of Fig. 1*

In considering the operation of the image-reproducing apparatus 40, it will be assumed initially that a color-television wave signal is being received and that the detector 12 derives therefrom the composite video-frequency signal including the luminance components for application to and translation by the video-frequency amplifier 13, the modulated subcarrier components containing the chromaticity information for application to and translation by the amplifier 21, and the color burst synchronizing components for derivation in amplifier 27 by the action of units 24, 25, and 27. The detector 29 responds to the color burst signal applied to the input terminals 39, 39 thereof and to the in-phase component of the color-reference signal applied to the input terminals 31, 31 thereof by the generator 41 and because of the proper phasing of the input signals, develops across the condenser 46 connected to its output terminals 36, 36 a potential of negative polarity for application to the input terminals 74, 74 of the control circuit 71 and to the input terminals 63, 63 of the control unit 38. The negative-polarity signal, applied to the input circuit of the tubes 73 of control circuit 71 renders that tube nonconductive and the optical filter 70 attached to the arm 80 remains in the position represented in Fig. 1 in the optical path between the fluorescent screen of the cathode-ray tube 17 and the screen 20. Since there is no appreciable flow of current through the winding 77 of control circuit 71, the potential of the anode of the tube 73 and, hence, the potential of the screen electrodes of the tubes 16 and 18 is substantially equal to that of the source +B. Accordingly, the tubes 16 and 18 are in a condition so that the cathode-ray beams are directed against the fluorescent screens thereof. The cathode-ray beam of the tube 17 will be projected against the fluorescent screen thereof since the energizing potential +Sc is continuously applied to the screen electrode of that tube.

The application of the negative potential developed across the condenser 46 to the input circuit of the tube 62 of control unit 38 is effective to render that tube nonconductive. The potential developed at the junction of the resistors 65 and 66 of the voltage divider comprising resistors 64, 65, and 66 is effective to render the diode 67 conductive. The terminal 68 connected to the junction of the resistors 65 and 66 applies a positive potential by way of one of the terminals 37, 37 and the tuned circuit 55 to the control electrode of the tube 49 of the controllable amplifier 22 while the terminal 68 connected to the cathode of the diode 67 applies a positive potential of somewhat lower value through the other of the terminals 37, 37 and resistor 52 to the cathode of tube 49. The potential just mentioned applied to the control electrode of tube 49 is effective to overcome the bias previously developed at the cathode of that tube by the voltage divider 54, 53 and the tube becomes conductive so that it is in a condition to translate from the input terminals 50, 50 of the amplifier 22 to the output terminals thereof the 2–4.3 megacycle modulated subcarrier components supplied by the amplifier 21.

The color-reference signal generator 41 applies to the input terminals 32, 32 and 34, 34 of the color-difference signal detector the in-phase and quadrature components of the 3.58 megacycle wave signal developed thereby. In the well-known manner, the color-difference signal detector 23 utilizes the modulated subcarrier components translated by the controllable amplifier 22 and the in-phase and quadrature components of the color-reference signal developed by the unit 41 to derive the desired color-difference signals R−Y, G−Y, and B−Y representing, respectively, the red, green, and blue values of the televised image. The signal-combining device 14 adds individual ones of the three different output signals of the unit 23 to the luminance signal Y from the video-frequency amplifier 13 and develops at the output terminals 48, 48, 48 for application to the control electrodes of the cathode-ray tubes 16, 17, and 18, respectively, the red, green, and blue color signals. The energization of the line-deflection and field-deflection windings of the cathode-ray tubes 16, 17, and 18 by the signals from the line-scanning and field-scanning generators 25 and 26 simultaneously deflects the cathode-ray beams of the cathode-ray tubes and traces a rectilinear pattern on the screens of those tubes. The cathode-ray tube 16 develops the red values of the televised image, the tube 17 similarly develops an image in monochrome which is representative of the green values of the image, while the tube 18 develops the blue values of the image of the televised object. The optical filter 70 produces only green light from the light emitted by the fluorescent screen of the cathode-ray tube 17. The optical projection unit 19 optically combines or superimposes on the projection screen 20 the three images developed by the cathode-ray tubes 16, 17, and 18 and the optical filter 70 so that there appears in natural colors on the screen 20 a reproduction of the televised object.

It will now be assumed that the wave signal intercepted by the antenna system 11, 11 of the receiver is a conventional monochrome television signal so that the detector 12 derives a video-frequency signal of the monochrome type for application to the amplifiers 13 and 21. Since such a video-frequency signal does not include a color burst synchronizing signal for translation by the synchronizing-signal separator 24 to an input circuit of the gated color burst signal amplifier 27, the latter does not apply to the input terminals 39, 39 of the detector 29 a 3.58 megacycle wave signal simultaneously with the application to the other pair of input terminals 31, 31 of unit 29 of what would normally be the in-phase component of the color-reference wave signal from the generator 41. Consequently, the output signal appearing at terminals 36, 36 of the detector 29 has a second or zero value. It will be recalled that during the reception of a color-television signal, the potential developed at the terminals 36, 36 for application to the terminals 74, 74 of control circuit 71 and to the input terminals 63, 63 of control unit 38 had a negative value. The zero value of the signal now applied to the input circuit of the tube 73 of control circuit 71 permits that tube to become conductive, thus causing a flow of current from the source +B through the resistor 78, the winding 77, the anode-cathode path of the tube, and the cathode resistor 75. The energization of winding 77 moves the magnetic core 79 and the arm 80 in a direction to remove the green filter 70 from its position in front of the fluorescent screen of the cathode-ray tube 17. In its retracted position, the filter 70 is also held away from the optical paths of the cathode-ray tubes 16 and 18. The current flow in the resistor 78 and the winding 77 so reduces the potential of the anode of the tube 73 and the high-potential one of the input terminals 72, 72 from its previous value that the potential of the screen electrodes of the cathode-ray tubes 16 and 18 is now insufficient to cause the cathode-ray beams from the electron guns thereof to impinge upon the fluorescent screens of those tubes. Accordingly, the cathode-ray tubes 16 and 18 are now effectively disabled insofar as reproducing an image is concerned. The refractive optical-projection unit 19, therefore, does not translate red or blue light from the tubes 16 and 18 to the projection screen 20.

Also during the occurrence of a received monochrome television signal, the zero value of the signal applied to the input circuit of the tube 62 of control unit 38 is effective to permit that tube to become conductive. The potential now developed at the junction of the resistors 65 and 66 of unit 38 with reference to the potential applied to the cathode of the diode 67 by the voltage divider comprising resistors 54 and 53 of the controllable amplifier 22 is such that the diode becomes nonconductive. Under this condition, the voltage divider 64, 65, 66 applies through the terminal 68 connected to the anode of the diode 67 and through the terminal 37 connected through the tuned circuit 55 to the control electrode of the tube 49 of controllable amplifier 22 a potential on that control electrode which is less positive than that applied to the cathode of the tube 49 throught the voltage divider 54, 53. The more positive potential on the cathode of the tube 49 biases it to cutoff so that the amplifier 22 is ineffective to translate any signal to the color-difference signal detector 23. However, the monochrome video-frequency signal is translated by the video-frequency amplifier 13 and is applied to the signal-combining device 14. This monochrome signal is applied to the control electrodes of individual ones of the cathode-ray tubes 16, 17, and 18. However, as previously explained, the tubes 16 and 18 are ineffective to develop an image on the fluorescent screens thereof since the screen potential of those tubes is insufficient to cause the cathode-ray beams thereof to strike the fluorescent screens. The monochrome signal intensity-modulates the cathode-ray beam of the tube 17 and the latter is effective in the well-known manner to develop an image of the televised object in black and white. The projection unit 19 projects the image appearing on the fluorescent screen of tube 17 on the display screen 20, thereby developing in monochrome an enlarged image of that object.

From the foregoing description of the image-reproducing apparatus 40, it will be seen that when it is conditioned to project an image in monochrome, registration problems are eliminated since only one cathode-ray tube is employed to develop that image. While the image-projection apparatus has been described in connection with a structure employing three cathode-ray tubes, one of which is effective to develop an image in monochrome, it will be clear to those skilled in the art that the apparatus may utilize two cathode-ray tubes, one for developing an image in monochrome and another for developing an image in two colors wherein the conjoint action of both tubes, the filter 70, the projection unit 19, and the screen 20 is effective to develop pictures in three colors. Such an apparatus is ineffective to develop images with the same quality as the three cathode-ray tube system of Fig. 1 but for some applications such an apparatus may have utility. It will also be clear to those skilled in the art that a simple amplitude detector may be coupled to the color-signal translating channel of the television receiver in lieu of the synchronous detector 29 for controlling the operation of devices such as units 71, 38, and 22 of the image-reproducing system 40. For example, such a detector may be connected to the output circuit of the 2–4.3 megacycle amplifier 21 for deriving a control effect for controlling the operation of units 78, 38, and 22.

When the receiver of Fig. 1 is translating applied monochrome television information, it is not necessary that the controllable amplifier 22 be in a nontranslating condition. However, it is preferable that the amplifier be disabled since high-visibility undesired spurious signals may result if high-frequency monochrome information was translated through the 2–4.3 megacycle amplifier 21 and unit 22 to the color-difference signal detector 23 and heterodyned in unit 23 with the unsynchronized color-reference wave signal applied to unit 23 by the generator 41.

*Description of image-reproducing apparatus of Figs. 2a and 2b*

Figs. 2*a* and 2*b* represent diagrammatically portions of a modification of the image-reproducing apparatus of Fig. 1. Such apparatus may have somewhat greater utility than the apparatus of Fig. 1 for "short throw" applications. The apparatus of Figs. 2*a* and 2*b* is generally similar to that of Fig. 1 and corresponding units are identified by the same reference numerals. Fig. 2*a* represents the optical portion of the image-reproducing apparatus when it is adjusted to produce an image in color whereas Fig. 2*b* represents the adjustment of that portion of the apparatus for producing an image in monochrome.

Referring now to Fig. 2*a*, a red reproducing device 16 of the cathode-ray tube type and a similar blue reproducing device are arranged with their fluorescent screens normal to each other. A color-selective or dichroic mirror 90 is arranged at a 45° angle with reference to the fluorescent screens of each of the devices 16 and 18. This mirror is effective to translate blue light emanating from the device 18 while reflecting red light emanating from the device 16. A white reproducing device 17 of the cathode-ray tube type is arranged near the device 16 and is oriented with reference to a fixed dichroic mirror 91 in the same manner that the device 16 is oriented with reference to the mirror 90. The dichroic mirror 91 is of the type which translates red and blue light but reflects green light incident on a surface thereof. A green filter 92 is mounted in the optical path between the reproducing device 17 and the dichroic mirror 91 and has one end thereof secured to a hinge 94 while the free end thereof rests against a stop 95. A plain mirror 93 is also attached to the hinge 94 and its free end rests against a stop 96. Instead of employing a single winding 77 and a magnetic core 79 as in Fig. 1, the Figs. 2*a* and 2*b* embodiments of the invention include a pair of windings 77, 77 and a pair of cores 79, 79, individual ones of the cores being attached to individual ones of the filter 92 and the plain mirror 93 by means of suitable arms 80, 80. The energization of the windings 77, 77 is accomplished in the same manner as represented in Fig. 1 of the drawings.

*Operation of image-reproducing apparatus of Figs. 2a and 2b*

The operation of the image-reproducing apparatus represented in Figs. 2*a* and 2*b* is generally similar to that explained in connection with Fig. 1. Accordingly, only the salient differences in operation need be explained. In Fig. 2*a* the positions of the dichroic mirrors and the green filter 92 are such that the apparatus is conditioned to reproduce images in natural colors. During such reproduction, the windings 77, 77 are de-energized as was explained in connection with the image-reproducing apparatus 40 of Fig. 1. When a monochrome television signal is received by the compatible receiver for use with the apparatus of Figs. 2*a* or 2*b*, the color burst synchronizing signal is not present and, as explained in connection with the apparatus 40 of Fig. 1, the windings 77, 77 are energized and displace or elevate the magnetic cores 79, 79 to the position represented in Fig. 2*b*. The movement of the cores acting through the arms 80, 80 is effective to rotate the green filter 92 and the plain mirror 93 about their common hinge 94 to the position represented in Fig. 2*b* wherein the filter and the plain mirror rest against the fixed dichroic mirror 91. The white-reproducing device 17 is effective to project white light against the plain mirror 93 for reflection in the well-known manner and display on the screen 20. This operation continues so long as monochrome information is being received by the compatible television receiver. The reception of a color-television signal is effective to de-energize the windings 77, 77 and the green filter 92 and the plain mirror 93 return to their original positions represented in Fig. 2*a* wherein they rest against the stops 95 and 96.

From the foregoing descriptions it will be seen that an image-reproducing apparatus in accordance with the present invention for a compatible color-television receiver is effective to produce colored pictures of good quality and monochrome pictures of a quality superior to those afforded by prior such receivers since no serious registration problems are encountered during the reproduction of the monochrome pictures. It will also be clear that an image-reproducing apparatus embodying the present invention for use in a compatible television receiver is relatively simple in construction and inexpensive to manufacture.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a compatible color-television receiver for receiving either a color-television signal including chromaticity-representative components or a monochrome television signal, an image-reproducing apparatus comprising: circuit means responsive to said received color-television signal for developing from said components a control effect having a first value in the presence of said components and a second value in the absence thereof; an image-reproducing system responsive to said received signals and comprising a plurality of cathode-ray image-reproducing devices including at least one responsive to said color-television signal for individually producing images in an individual color and a second responsive to said signals for producing monochrome images and comprising an optical filter for said second device selectively adjustable to permit said second device to produce images in monochrome or in a second color; and control means coupled to said developing circuit means and said filter and responsive to said first value of said control effect for adjusting said filter to permit said system to produce images in color and responsive to said second value of said control effect for effectively removing said filter so that images only in monochrome are produced.

2. In a compatible color-television receiver for receiving either a color-television signal including pulse-modulated subcarrier components or a monochrome television signal, an image-reproducing apparatus comprising: circuit means responsive to said received color-television signal for developing from said subcarrier components a control effect having a first value in the presence of said subcarrier components and a second value in the absence thereof; an image-reproducing system responsive to said received signals and comprising a plurality of cathode-ray image-reproducing devices including at least one responsive to said color-television signal for individually producing images in an individual color and a second responsive to said signals for producing monochrome images and comprising an optical filter for said second device selectively adjustable to permit said second device to produce images in monochrome or in a second color; and control means coupled to said developing circuit means and said filter and responsive to said first value of said control effect for adjusting said filter to permit said system to produce images in color and responsive to said second value of said control effect for effectively removing said filter so that images only in monochrome are produced.

3. In a compatible color-television receiver for receiving either a color-television signal including chromaticity-representative components or a monochrome television signal, an image-reproducing apparatus comprising: circuit means responsive to said received color-television signal for developing from said components a control effect having a first value in the presence of said components and a second value in the absence thereof; an image-reproducing system responsive to said received signals and comprising a plurality of cathode-ray image-reproducing devices including at least one responsive to said color-television signal for individually producing images in an individual color and a second responsive to said signals for producing monochrome images and comprising an optical filter for said second device selectively movable to a first position to permit said second device to produce images in monochrome or to a second position to permit said device to produce images in a second color; and control means coupled to said developing circuit means and said filter and responsive to said first value of said control effect for moving said filter to said second position and adjusting said system to permit said system to produce images in color and responsive to said second value of said control effect for moving said filter to said first position and adjusting said system so that images only in monochrome are produced.

4. In a compatible color-television receiver for receiving either a color-television signal including modulated subcarrier components or a monochrome television signal, an image-reproducing apparatus comprising: circuit means responsive to said received color-television signal for developing from said components a control effect having a first value in the presence of said components and a second value in the absence thereof; an image-reproducing system responsive to said color signal and to said monochrome signal and comprising three cathode-ray image-reproducing devices including two responsive to said color-television signal for individually producing images in individual ones of two primary colors and a third responsive to said signals for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for effectively removing said filter so that images only in monochrome are produced.

5. In a compatible color-television receiver for receiving either a color-television signal including modulated subcarrier components or a monochrome television signal, an image-reproducing apparatus comprising: circuit means responsive to said received color-television signal for developing from said components a control effect having a first value in the presence of said components and a second value in the absence thereof; an image-reproducing system responsive to said color signal and to said monochrome signal and comprising three cathode-ray image-reproducing devices including two responsive to said color-television signal and having fluorescent screens emitting red and blue light for individually producing images in red and blue and a third responsive to said signals and having a fluorescent screen emitting white light for producing monochrome images and comprising a green optical filter for said third device selectively adjustable to permit said third device to produce images in monochrome or in a green color; and control means coupled to said developing circuit means and said filter and responsive to said first value of said control effect for adjusting said filter to permit said system to produce images in color and responsive to said second value of said control effect for effectively removing said filter so that images only in monochrome are produced.

6. In a compatible color-television receiver for receiving either a color-television signal including modulated subcarrier components or a monochrome television signal, an image-projection apparatus comprising: circuit means responsive to said received color-television signal for developing from said components a control effect having a first value in the presence of said components and a second value in the absence thereof; an image-projection system responsive to said color signal and to said monochrome signal and comprising three cathode-ray image-reproducing devices including two responsive to said color-television signal for individually producing images in individual ones of two primary colors and a third responsive to said signals for producing monochrome images and comprising a viewing screen, an optical system for projecting said images on said screen, and an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for adjusting said filter and said system so that images only in monochrome are produced.

7. In a compatible color-television receiver for receiving either a color-television signal including modulated subcarrier components or a monochrome television signal, an image-projection apparatus comprising: circuit means responsive to said received color-television signal for developing from said components a control effect having a first value in the presence of said components and a second value in the absence thereof; an image-projection system responsive to said color signal and to said monochrome signal and comprising three cathode-ray image-reproducing devices including two responsive to said color-television signal for individually producing images in individual ones of two primary colors and a third responsive to said signals for producing monochrome images and comprising a viewing screen, an optical system including a pair of dichroic mirrors for projecting said images on said screen, and a plain mirror and an optical filter for said third device both selectively adjustable with reference to one of said dichroic mirrors to permit said third device to produce on said screen images in monochrome or in a third primary color; and control means coupled to said developing circuit means and one of said dichroic mirrors and responsive to said first value of said control effect for adjusting said one mirror to permit said system to produce images in color and responsive to said second value of said control effect for adjusting said filter and said plain mirror so that images only in monochrome are produced.

8. In a compatible color-television receiver for receiving either a color-television signal including modulated subcarrier components or a monochrome television signal, an image-reproducing apparatus comprising: circuit means responsive to said received color-television signal for developing from said components a control effect having a first value in the presence of said components and a second value in the absence thereof; an image-reproducing system responsive to said color signal and to said monochrome signal and comprising three cathode-ray image-reproducing devices including two responsive to said color-television signal for individually producing images in individual ones of two primary colors and a third responsive to said signals for producing monochrome images and comprising an optical filter for said third device selectively adjustable to permit said third device to produce images in monochrome or in a third primary color; and control means coupled to said developing circuit means and said filter and including an electrical motor for adjusting said filter and including a cathode-ray beam-control circuit for said two cathode-ray devices responsive to said first value of said control effect for adjusting said filter and conditioning said two cathode-ray devices to permit said system to produce images in color and responsive to said second value of said control effect for adjusting said filter and conditioning said two cathode-ray devices so that images only in monochrome are produced.

9. In a compatible color-television receiver for receiving either a color-television signal including modulated subcarrier components or a monochrome television signal, an image-projection apparatus comprising: circuit means responsive to said received color-television signal for developing from said components a control effect having a first value in the presence of said components and a second value in the absence thereof; an image-projection system responsive to said color signal and to said monochrome signal and comprising three cathode-ray image-reproducing devices and a refractive-type optical-projection unit therefor including two of said devices responsive to said color-television signal for individually producing images in individual ones of two primary colors and a third of said devices responsive to said signals for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for effectively removing said filter so that images only in monochrome are produced.

10. In a compatible color-television receiver for receiving either a color-television signal including modulated subcarrier components or a monochrome television signal, an image-projection apparatus comprising: circuit means responsive to said received color-television signal for developing from said components a control effect having a first value in the presence of said components and a second value in the absence thereof; an image-projection system responsive to said color signal and to said monochrome signal and comprising three cathode-ray image-reproducing devices and a mirror-type optical-projection unit therefor including two of said devices responsive to said color-television signal for individually producing images in individual ones of two primary colors and a third of said devices responsive to said signals for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for adjusting said filter and said projection unit so that images only in monochrome are produced.

11. In a compatible color-television receiver for receiving either a color-television signal including luminance components and modulated subcarrier components or a monochrome television signal, an image-reproducing apparatus comprising: circuit means responsive to said received color-television signal for developing from said modulated subcarrier components a control effect having a first value in the presence of said modulated subcarrier components and a second value in the absence thereof; a signal-translating channel responsive to said monochrome signal and including an output circuit for translating thereto both said monochrome signal and said luminance components; a detector system including said output circuit and responsive to said first value of said control effect and said received color-television signal for deriving from said modulated subcarrier components the chromaticity components thereof during that value and responsive to said second value of said control effect during that value for interrupting said derivation; an image-reproducing system coupled to said output circuit and responsive to said luminance and chromaticity components and to said monochrome signal and comprising three cathode-ray image-reproducing devices including two responsive to two of said chromaticity components for individually producing images in individual ones of two primary colors and a third responsive to said monochrome signal and the third of said chromaticity components for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for adjusting said filter and said system so that images only in monochrome are produced.

12. In a compatible color-television receiver for receiving either a color-television signal including luminance components and modulated subcarrier components or a monochrome television signal, an image-reproducing apparatus comprising: circuit means responsive to said received color-television signal for developing from said modulated subcarrier components a control effect having a first value in the presence of said modulated subcarrier components and a second value in the absence thereof; a signal-translating channel responsive to said monochrome signal and including an output circuit for translating thereto both said monochrome signal and said luminance components; a detector system responsive to said received color-television signal and including in cascade an amplifier responsive to said first value of said control effect during that value and a detector having said output circuit for deriving therein from said modulated subcarrier component during said first value the chromaticity components of said modulated subcarrier components, said amplifier being responsive to said second value of said control effect during that value for interrupting said derivation; an image-reproducing system coupled to said output circuit and responsive to said luminance and chromaticity components and to said monochrome signal and comprising three cathode-ray image-reproducing devices including two responsive to two of said chromaticity components for individually producing images in individual ones of two primary colors and a third responsive to said monochrome signal and the third of said chromaticity components for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for adjusting said filter and said system so that images only in monochrome are produced.

13. In a compatible color-television receiver for receiving either a color-television signal including chromaticity-representative components or a monochrome television signal, an image-reproducing apparatus comprising: circuit means responsive to said received color-television signals for developing from said components a control effect having a first value in the presence of said components and a second value in the absence thereof; an image-reproducing system responsive to said received signals and comprising a plurality of cathode-ray image-reproducing devices including at least one responsive to said color-television signal for individually producing images in an individual color and a second responsive to said signals for producing monochrome images and comprising an optical filter for said second device selectively adjustable to permit said second device to produce images in monochrome and in a second color; and control means coupled to said developing circuit means and said system and including an adjusting means for said filter and a cathode-ray beam-control circuit for said at least one cathode-ray device responsive to said first value of said control effect for conditioning said at least one cathode-ray device to permit said system to produce images in color and responsive to said second value of said control effect for adjusting said filter and conditioning said at least one cathode-ray device so that images only in monochrome are produced.

14. In a compatible color-television receiver for receiving either a color-television signal including modulated subcarrier components or a monochrome television signal, an image-reproducing apparatus comprising: circuit means responsive to said received color-television signals for developing from said components a control effect having a first value in the presence of said components and a second value in the absence thereof; an image-reproducing system responsive to said color signal and to said monochrome signal and comprising three cathode-ray image-reproducing devices including two responsive to said color-television signal for individually producing images in individual ones of two primary colors and a third responsive to said signals for producing monochrome images and comprising an optical filter for said third device selectively adjustable to permit said third device to produce images in monochrome or in a third primary color; and control means coupled to said developing circuit means and said system and including adjusting means for said filter and a screen-electrode potential supply for two of said devices responsive to said first value of said control effect for energizing said two devices to permit said system to produce images in color and responsive to said second value of said control effect for adjusting said filter and energizing said two devices so that images only in monochrome are produced.

15. In a compatible color-television receiver for receiving either a color-television signal including pulse-modulated subcarrier components or a monochrome television signal, an image-reproducing apparatus comprising: a detector responsive to an applied reference wave signal and to said received color-television signal for developing a control effect having a first value in the presence of said components and a second value in the absence thereof; an image-reproducing system responsive to said color signal and to said monochrome signal and comprising three cathode-ray image-reproducing devices including two for individually producing images in individual ones of two primary colors and a third for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter to permit said system to produce images in color and responsive to said second value of said control effect for adjusting said filter and said system so that images only in monochrome are produced.

16. In a compatible color-television receiver for receiving a television signal which may be either a color-television signal including modulated subcarrier components or a monochrome television signal, an image-projection apparatus comprising: circuit means responsive to said received color-television signal for developing from said components a control effect having a first value in the presence of said components and a second value in the absence thereof; an image-projection system responsive to said color signal and to said monochrome signal and comprising three cathode-ray image-reproducing devices including two responsive to said color-television signal for individually producing images in individual ones of two primary colors and a third responsive to said signals for producing monochrome images and comprising an optical filter for said third device selectively adjustable to permit said third device to produce images in monochrome or in a third primary color; and control means coupled to said developing circuit means and said filter and responsive to said first value of said control effect for adjusting said filter and said two devices to permit said system to produce images in color and responsive to said second value of said control effect for effectively removing said filter so that images only in monochrome are produced.

17. A compatible color television receiver comprising at least two picture tubes including one producing a black-and-white image alone when excited, the remaining said tubes producing images in a primary color when excited, a movable filter mounted in front of said one tube and converting said black-and-white image into an image in a primary color other than the primary color images produced by said remaining tubes, optical means positioned to optically unite the images on said tubes, means for exciting all of said picture tubes to produce a color image with said optical means, and means for selectively providing black-and-white television comprising first means for moving said filter away from its position in front of said one tube and second means for exciting only said one tube and not exciting said remaining tubes, whereby the black-and-white image on said one tube may be directly viewed.

18. A receiver as set forth in claim 17 wherein said one tube includes a phosphor producing white light when excited, and said remaining tubes include phosphors luminescing in different primary colors when excited.

19. A receiver as set forth in claim 17 wherein the optical means includes a color-selective mirror interposed in the light path of said one tube and coupled to the selective means.

20. A receiver as set forth in claim 19 wherein the selective means comprises a reflecting mirror and third means for replacing the color-selective mirror with the reflecting mirror.

References Cited in the file of this patent

UNITED STATES PATENTS

| | | |
|---|---|---|
| 2,287,307 | Herbst | June 23, 1942 |
| 2,672,502 | Albright | Mar. 16, 1954 |
| 2,681,379 | Schroeder et al. | June 15, 1954 |